United States Patent
Uchida et al.

(12) 
(10) Patent No.: US 6,327,610 B2
(45) Date of Patent: *Dec. 4, 2001

(54) SYSTEM FOR BROADCASTING ELECTRONIC MAILS THAT SEPARATELY STORES AND SENDS A PORTION OF ELECTRONIC MAILS WITH AN ACCESS CODE FOR FILTERING AND RETRIEVING PURPOSE

(75) Inventors: Wataru Uchida; Tsutomu Nozaki, both of Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,539

(22) Filed: Jun. 24, 1998

(30) Foreign Application Priority Data

Jun. 27, 1997 (JP) .................................................. 9-171941

(51) Int. Cl.⁷ ..................................................... G06F 15/16
(52) U.S. Cl. ........................................... 709/206; 709/217
(58) Field of Search .................................... 709/206, 207, 709/219, 238, 245, 249, 204, 217; 707/2; 713/201; 379/93.01

(56) References Cited

U.S. PATENT DOCUMENTS

| 5,684,606 | * | 11/1997 | Yoshida | 358/437 |
| 5,781,901 | * | 11/1998 | Kazuma | 707/10 |
| 5,818,447 | * | 10/1998 | Wolf et al. | 345/335 |
| 5,844,969 | * | 12/1998 | Goldman et al. | 379/93.24 |
| 5,917,489 | * | 6/1999 | Thurlow et al. | 345/347 |

(List continued on next page.)

FOREIGN PATENT DOCUMENTS

| 60-226250 | 11/1985 | (JP) . |
| 60-260253 | 12/1985 | (JP) . |
| 61-177050 | 8/1986 | (JP) . |
| 64-11442 | 1/1989 | (JP) .............................. H04L/11/20 |
| 2-195749 | 8/1990 | (JP) . |
| 9-331349 | 12/1997 | (JP) . |

OTHER PUBLICATIONS

Rooney, "CE software takes aim at Internet E–mail", ZDNet, 2 pages, Nov. 1996.*

WYND Communications Corp, "WyndMail wireless communication for Window CE . . . ", Business Wire, 2 pages, Feb. 1997.*

RFC 1734, POP3 AUTHentication command, http://rfc, fh–koeln.de/rfc/html_gz/, Meyers et al., pp. 1–6, Dec. 1994.*

(List continued on next page.)

*Primary Examiner*—Le Hien Luu
*Assistant Examiner*—Bunjob Jaroenchonwanit
(74) *Attorney, Agent, or Firm*—McGuireWoods LLP

(57) ABSTRACT

A broadcast communication system in which a terminal unit for sending electronic mail transmits electronic mail data containing text of electronic mail, transmission destination data, a first command indicative of a transmission condition and a second command indicating that broadcast distribution is to be conducted, a mail server, upon reception of electronic mail data containing a second command, transmits a title and an access code of electronic mail text to all of terminal units of transmission destinations indicated by transmission destination data and upon reception of electronic mail data not containing a second command, sends back electronic mail text corresponding to the access code, and a terminal unit for receiving electronic mail, at the time of reception of distribution of electronic mail text, transmits electronic mail data containing an access code to the mail server.

12 Claims, 7 Drawing Sheets

U.S. PATENT DOCUMENTS

| | | | |
|---|---|---|---|
| 5,930,471 | * | 7/1999 | Milewski et al. .................... 709/204 |
| 5,930,479 | * | 7/1999 | Hall ...................................... 709/238 |
| 5,931,905 | * | 8/1999 | Hashimoto et al. ................. 709/217 |
| 5,937,164 | * | 8/1999 | Magers et al. ....................... 709/218 |
| 5,941,946 | * | 8/1999 | Baldwin et al. ..................... 709/206 |
| 5,944,786 | * | 8/1999 | Quinn .................................. 709/206 |
| 5,987,440 | * | 11/1999 | O'Neil et al. .......................... 705/44 |
| 5,987,464 | * | 11/1999 | Schneider .............................. 707/10 |
| 5,995,597 | * | 11/1999 | Woltz et al. ...................... 379/93.24 |
| 5,996,006 | * | 11/1999 | Speicher .............................. 709/218 |
| 6,006,215 | * | 12/1999 | Retallick .................................. 707/2 |
| 6,029,192 | * | 2/2000 | Hill et al. ............................. 709/206 |

OTHER PUBLICATIONS

RFC1939, Post Office Protocol—Version 3, http://frc.fh_koeln,de/rfc.html_gz/, Meyers et al., pp. 1–25, May 1996.*

Japanese Office Action, dated Jul. 4, 2000, with English language translation of Japanese Examiner's comments.

Japanese Office Action, dated Oct. 17, 2000, with English language translation of Japanese Examiner's comments, 3 page.

* cited by examiner

SYSTEM FOR BROADCASTING ELECTRONIC MAILS THAT SEPARATELY STORES AND SENDS A PORTION OF ELECTRONIC MAILS WITH AN ACCESS CODE FOR FILTERING AND RETRIEVING PURPOSE

BACKGROUND OF THE INVENTION

1. Field of the Invention

The present invention relates to a broadcast communication system for distributing electronic mail to a plurality of specific subscribers over networks such as an internet and a local area network (LAN) and an electronic mail distribution method thereof.

2. Description of the Related Art

As a mode of using electronic mail by which data and messages are sent or received to/from a plurality of computer systems such as a personal computer and a workstation connected through a network, there is broadcast communication which distributes electronic mail to a plurality of specific subscribers at a time. In recent years, with the development of a public wide area network (WAN) such as an internet, use of broadcast communication by means of electronic mail has been sharply rising.

Conventionally employed for a broadcast communication system using electronic mail of this kind are an electronic mail system shown in FIG. 6 and a mail server shown in FIG. 7. FIG. 6 is a schematic diagram showing structure of an electronic mail system, while FIG. 7 is a block diagram showing structure of a conventional mail server which realizes an electronic mail system.

The electronic mail system shown in FIG. 6 has a mail server 600, a sending station 740 for sending electronic mail and a plurality of accepting stations 750 for receiving electronic mail connected with each other over a network. In the illustrated example, the mail server 600, the sending station 740 and each accepting station 750 are respectively connected to individual networks 231, 232 and 233 which are connected to an internet 210 through access points 221, 222 and 223, respectively. This arrangement enables transmission of electronic mail from the sending station 740 to each accepting station 750. Although the sending station 740 for sending electronic mail and the accepting station 750 for receiving electronic mail are separated from each other for the explanation's sake, they have no difference in structure as a terminal unit and function as the sending station 740 when individual terminal units connected to the network send electronic mail and function as the accepting station 750 when they receive electronic mail. Also in the illustrated example, although the mail server 600 and the terminal units 740 and 750 are connected to a plurality of networks connected to each other over the internet 210, networks can take any form and even with a simple WAN or LAN not connected to the internet 210, basic structure of an electronic mail system including the mail server 600, the terminal units 740 and 750 remains the same.

With reference to FIG. 7, the mail server 600 includes an input/output interface 610, an input unit 620 and an output unit 630 for sending and receiving electric mail and other data to and from a network 231, a storage unit 640 for storing electronic mail, a command processing unit 650 for conducting various processing for the distribution of electronic mail, and a control unit 660 for controlling operation of each of these function execution units.

In thus structured electronic mail system, a user who intends to send electronic mail (hereinafter referred to as sender) sends a set of mail data containing a main body (text) of electronic mail which is a main portion of the electronic mail, transmission destination data indicating a destination of electronic mail, and a transmission command indicative of an electronic mail distribution condition from the terminal units 740 to the mail server 600. Mail data applied to the input/output interface 610 of the mail server 600 through the network 231 is transferred to the input unit 620 by the instruction from the control unit 660. Then, of the mail data in question, the electronic mail main body and the transmission destination data are transferred to the storage unit 640 and stored at a predetermined position. The transmission command is transferred to the command processing unit 650.

Next, the command processing unit 650 analyzes the received transmission command and in accordance with the instruction of the transmission command, instructs the storage unit 640 to retrieve and output an electronic mail main body and transmission destination data. The storage unit 640 transfers the electronic mail main body and the transmission destination data to the output unit 630 in accordance with the instruction from the command processing unit 650. The output unit 630 sends the electronic mail main body in question to the accepting station 750 used by a predetermined user (hereinafter referred to as receiver) in accordance with the transmission destination data in question.

In the foregoing processing, designating a plurality of receivers as transmission destination data leads to realization of broadcast communication by means of electronic mail. Depending on the contents of a transmission command, a main body of electronic mail in question may be held in a mail box assigned to a receiver in the storage unit 640 in accordance with instructions from the command processing unit 650 and the control unit 660 and be transmitted in response to access made by the receiver in question by means of electronic mail.

In the above-described broadcast communication using electronic mail, increase in the number of subscribers to service as a party to which electronic mail is sent results in concentration of enormous traffic on a network (the network 231 in the example shown in FIG. 6) to which the mail server connects. This adversely affects throughput of other terminal units connected to the network in question.

In addition, there is a case where information of broadcast-communicated electronic mail is unnecessary temporarily or for a long period of time for reasons of a subscriber to service. In this case, sending electronic mail to the subscriber to the service in question results in wasteful use of network resources to deteriorate efficiency.

One of conventional art intended to efficiently use a network line while avoiding such situations as mentioned above is, for example, a technique disclosed in Japanese Patent Laying-Open (Kokai) No. Heisei 64-11442, entitled "Electronic Mail Communication Control Method". The literature recites a communication control method aimed at reducing contentions among sending stations by divisionally managing electronic mail as a main body of electronic mail and a header part, notifying an accepting station of a header part prior to transmission of an electronic mail main body and preengaging transmission time of an electronic mail main body.

While the communication control method disclosed in the above literature enables prevention of congestion in terms of time at the transmission of electronic mail, the method is still premised that a main body of mail is sent to all terminal units. This is because no means is provided for determining at an accepting station whether information of electronic mail is necessary for a subscriber to service. This disables avoidance of wasteful use of a network line caused by the transmission of electronic mail also to a terminal unit of a subscriber to service who needs no information of the electronic mail.

SUMMARY OF THE INVENTION

An object of the present invention is to provide a broadcast communication system which enables prevention of enormous traffic at a network caused by distribution of electronic mail by transmitting a predetermined notification of small data size to an accepting station prior to transmission of a main body of electronic mail, and an electronic mail distribution method thereof.

Another object of the present invention, in addition to the above object, is to provide a broadcast communication system enabling efficient use of a network line by transmitting a main body of electronic mail only to a subscriber to service who wants reception of the electronic mail, and an electronic mail distribution method thereof.

According to the first aspect of the invention, a broadcast communication system for distributing electronic mail to a plurality of subscribers to service at a time by means of an electronic mail system, comprises a mail server and a first and second terminal units connected with each other over a network, wherein the first terminal unit for sending electronic mail, sends electronic mail containing at least body of electronic mail, transmission destination data indicative of a transmission destination of the electronic mail, a first command indicative of a transmission condition of the electronic mail and a second command indicating that the electronic mail is to be broadcast-distributed, the mail server upon reception of the electronic mail containing the second command, transmits a title of the body of the electronic mail and an access code for accessing the body of the electronic mail to all of the second terminal units as transmission destinations indicated by the transmission destination data contained in the electronic mail, and upon reception of request for the body of the electronic mail, transmits the body of the electronic mail corresponding to the access code back to the second terminal unit which has transmitted the request for the body of the electronic mail, and the second terminal unit for receiving the electronic mail, upon reception of the title and the access code from the mail server, for receiving distribution of the body of the electronic mail corresponding to the title and the access code, transmits electronic mail containing the access code to the mail server.

In the preferred construction, the second terminal unit transmits electronic mail containing not the second command but the access code to the mail server as the request for the body of the electronic mail.

In the preferred construction, the first terminal unit produces the title of the body of the electronic mail body to be transmitted and the access code, adds the title and the access code to corresponding the electronic mail and transmits the electronic mail.

In the preferred construction, the mail server, upon reception of the electronic mail containing the second command, produces, based on the body of the electronic mail, the title of the body of the electronic mail and the access code and adds the title and the access code to the electronic mail.

In another preferred construction, the contents of the title of the electronic mail include an excerpt of the body of the electronic mail.

Also, the second command is included in the first command.

According to the second aspect of the invention, an electronic mail distribution method of conducting broadcast communication for distributing electronic mail to a plurality of subscribers to service at a time by means of an electronic mail system including a mail server and a first and second terminal units connected with each other over a network, comprising the steps of in the first terminal unit for sending electronic mail, producing electronic mail containing body of electronic mail, a title of the body of the electronic mail, transmission destination data indicative of a transmission destination of the electronic mail, a first command indicative of a transmission condition of the mail, a second command indicating that the mail is to be broadcast-distributed and an access code for accessing the body of the electronic mail, and transmitting the electronic mail produced to the mail server, in the mail server, checking whether received electronic mail contains the second command, upon detection of the second command, transmitting the title of the body of the electronic mail and the access code contained in the electronic mail to all of the second terminal units of transmission destinations indicated by the transmission destination data contained in the electronic mail, upon detection of none of the second command, checking whether the access code is contained in the electronic mail, and upon detection of the access code, transmitting the body of the electronic mail corresponding to the access code detected to the terminal unit which has sent the electronic mail, in the second terminal unit for receiving the electronic mail, upon reception of the title and the access code from the mail server, transmitting electronic mail containing the access code to the mail server according to indication of receiving distribution of the boy of the electronic mail from a user.

In the preferred construction, in the second terminal unit, further including a step of urging a user to determine whether to receive distribution of the body of the electronic mail corresponding to the title and access code received, upon reception of the title and the access code from the mail server.

In the preferred construction, in the first terminal unit, the electronic mail data producing step comprises at the production of the transmission destination data, checking whether a transmission destination of the electronic mail is registered at the mail server, when the transmission destination is registered at the mail server, selecting the registered code as the transmission destination data, and when the transmission destination is not registered at the mail server, producing a list of transmission destinations as the transmission destination data.

According to another aspect of the invention, a computer readable memory storing a computer program for conducting broadcast communication for distributing electronic mail to a plurality of subscribers to service at a time by means of an electronic mail system including a mail server and a plurality of terminal units connected with each other over a network, the computer program comprising the steps of in the first terminal unit for sending electronic mail producing electronic mail containing body of electronic mail, a title of the body of the electronic mail, transmission destination data indicative of a transmission destination of the electronic mail, a first command indicative of a transmission condition of the mail, a second command indicating that the mail is to be broadcast-distributed and an access code for accessing the body of the electronic mail, and transmitting the electronic mail produced to the mail server, in the mail server, checking whether received electronic mail contains the second command, upon detection of the second command, transmitting the title of the body of the electronic mail and the access code contained in the electronic mail to all of the second terminal units of transmission destinations indicated by the transmission destination data contained in the electronic mail, upon detection of none of the second command, checking whether the access code is contained in the electronic mail, and upon detection of the access code, transmitting the body of the electronic mail corresponding to the access code detected to the terminal unit which has sent the electronic mail, in the second terminal unit for receiving the electronic mail, upon reception of the title and the access code from the mail server, transmitting electronic mail containing the access code to the mail server according to indication of receiving distribution of the boy of the electronic mail from a user.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
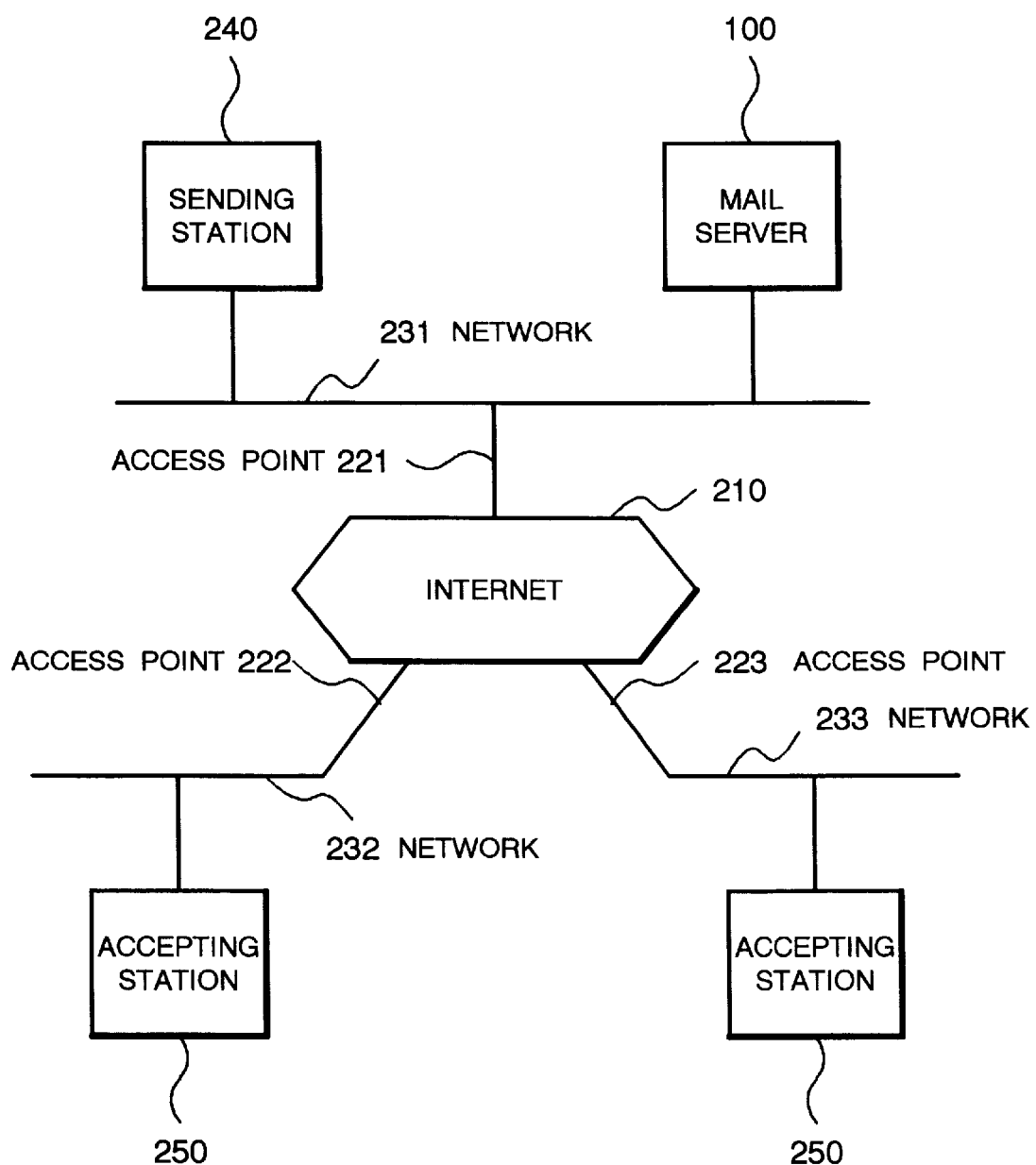
FIG. 1 is a schematic diagram showing structure of an electronic mail system which realizes a broadcast communication system according to one embodiment of the present invention.
Figure 2:
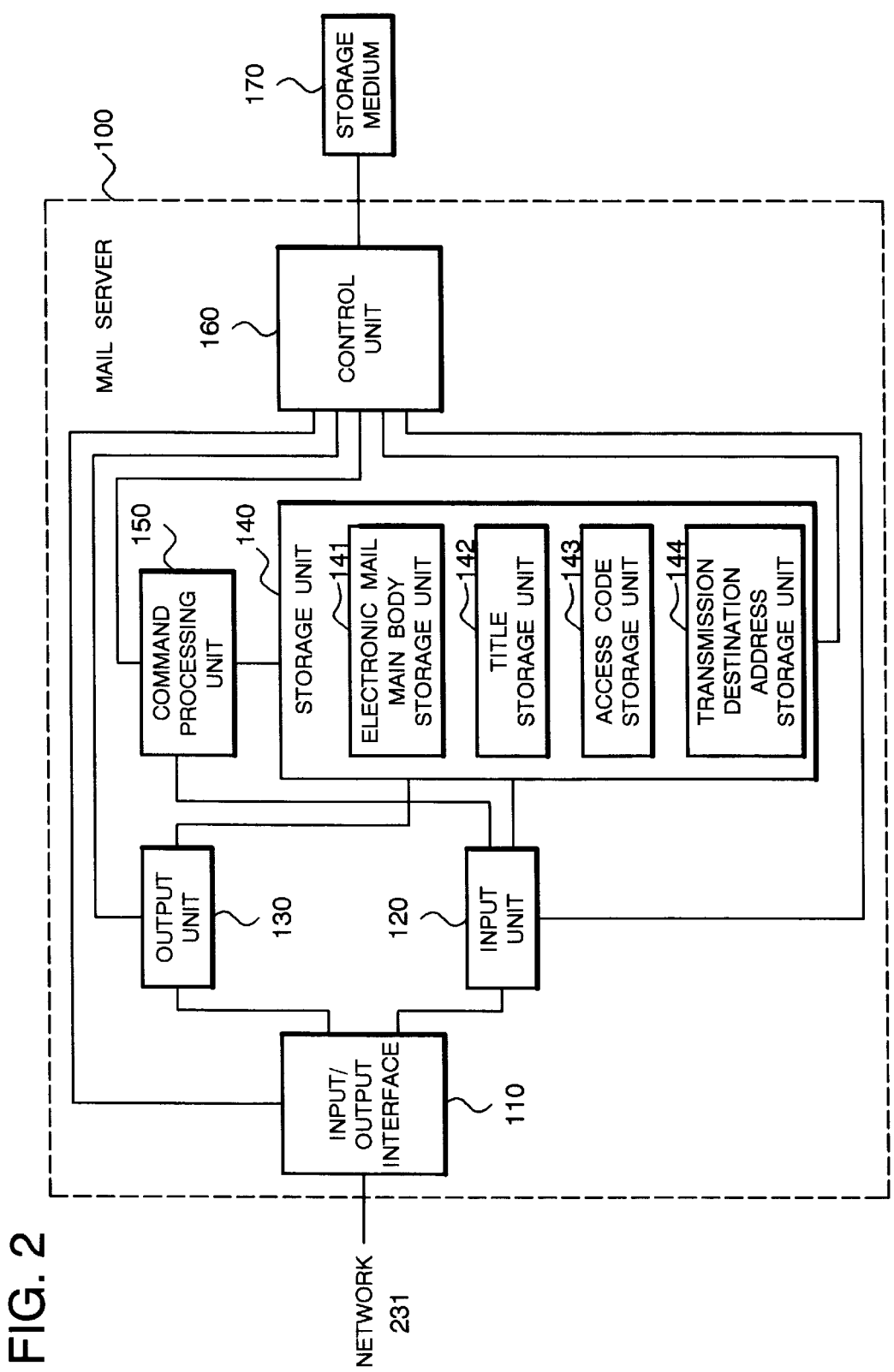
FIG. 2 is a block diagram showing structure of a mail server in the present embodiment.

FIG. 1 is a schematic diagram showing structure of an electronic mail system which realizes a broadcast communication system using electronic mail according to one embodiment of the present invention, while FIG. 2 is a block diagram showing structure of a mail server in the present embodiment. In FIGS. 1 and 2, illustration is made only of a characteristic part of the structure of the present embodiment and that of the remaining common part is omitted.

As shown in FIG. 1, the electronic mail system realizing a broadcast communication system according to the present embodiment is the same in basic structure as a conventional electronic mail system. More specifically, the electronic mail system has a mail server 100, a sending terminal 240 for sending electronic mail and a plurality of accepting stations 250 for receiving electronic mail connected with each other over a network. In the present embodiment, the mail server 100, the sending station 240 and the accepting station 250 are implemented by a computer system such as a personal computer or a workstation. Although the sending station 240 for sending electronic mail and the accepting station 250 for receiving electronic mail are separated from each other for the explanation's sake, they have no difference in structure as a terminal unit and function as the sending station 240 when individual terminal units connected to the network send electronic mail and function as the accepting station 250 when they receive electronic mail. Also in the illustrated example, although the mail server 100 and the terminal units 240 and 250 are connected to a plurality of networks connected to each other over the internet 210, networks can take any form and even with a simple WAN or LAN not connected to the internet 210, basic structure of an electronic mail system including the mail server 100 and the terminal units 240 and 250 remains the same. In addition, it is clearly understood that although in FIG. 1, a total of three terminal units 240 and 250 are illustrated, the number of terminal units is not limited to that shown in the figure.

With reference to FIG. 2, the mail server 100 includes an input/output interface 110, an input unit 120 and an output unit 130 for sending and receiving electric mail and other data to and from the network 231, a storage unit 140 for storing electronic mail, a command processing unit 150 for conducting various processing for distributing electronic mail, and a control unit 160 for controlling operation of each of these function execution units.

In above-described structure, the storage unit 140, which is implemented by an external storage device such as a magnetic disk device or an internal memory such as an RAM, includes an electronic mail main body storage unit 141 for storing a main body of electronic mail which is a main portion (text) of the electronic mail, a title storage unit 142 for storing a title of electronic mail, an access code storage unit 143 for storing an access code as a key for access to the electronic mail in question, and a transmission destination address storage unit 144 for storing transmission destination data indicating a destination of electronic mail.

The control unit 160 is implemented by program-controlled CPU and internal memory such as an RAM. A control program which controls the CPU is stored in a storage medium 170 for provision and loaded into the control unit 160 to conduct control of the above-described function execution units. Applicable as the storage medium 170 is a common storage medium such as a magnetic disk, an optical disk or a semiconductor memory.

Figure 3:
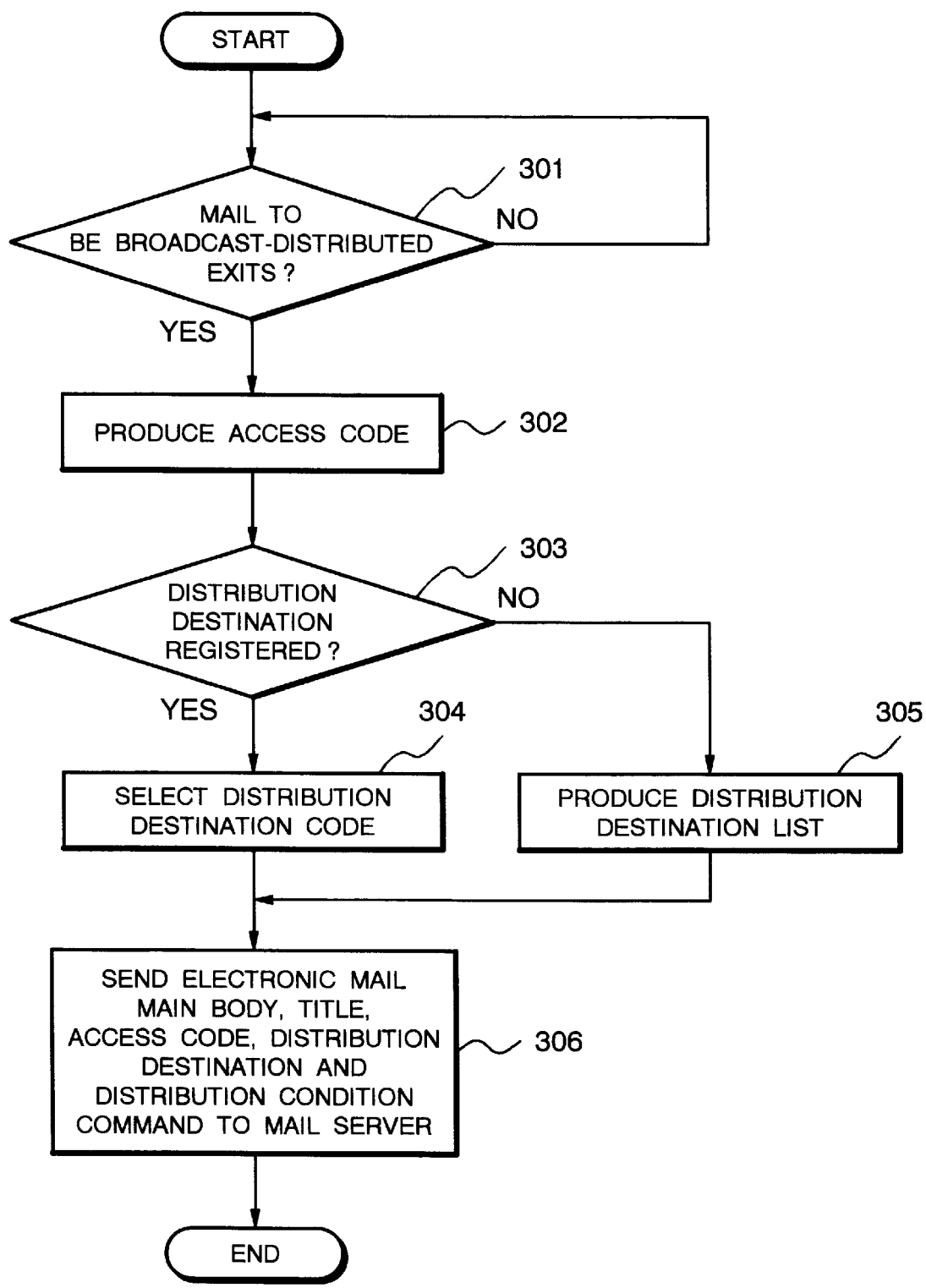
FIG. 3 is a flow chart showing operation conducted by a sending station to broadcast-distribute electronic mail in the present embodiment.
Figure 4:
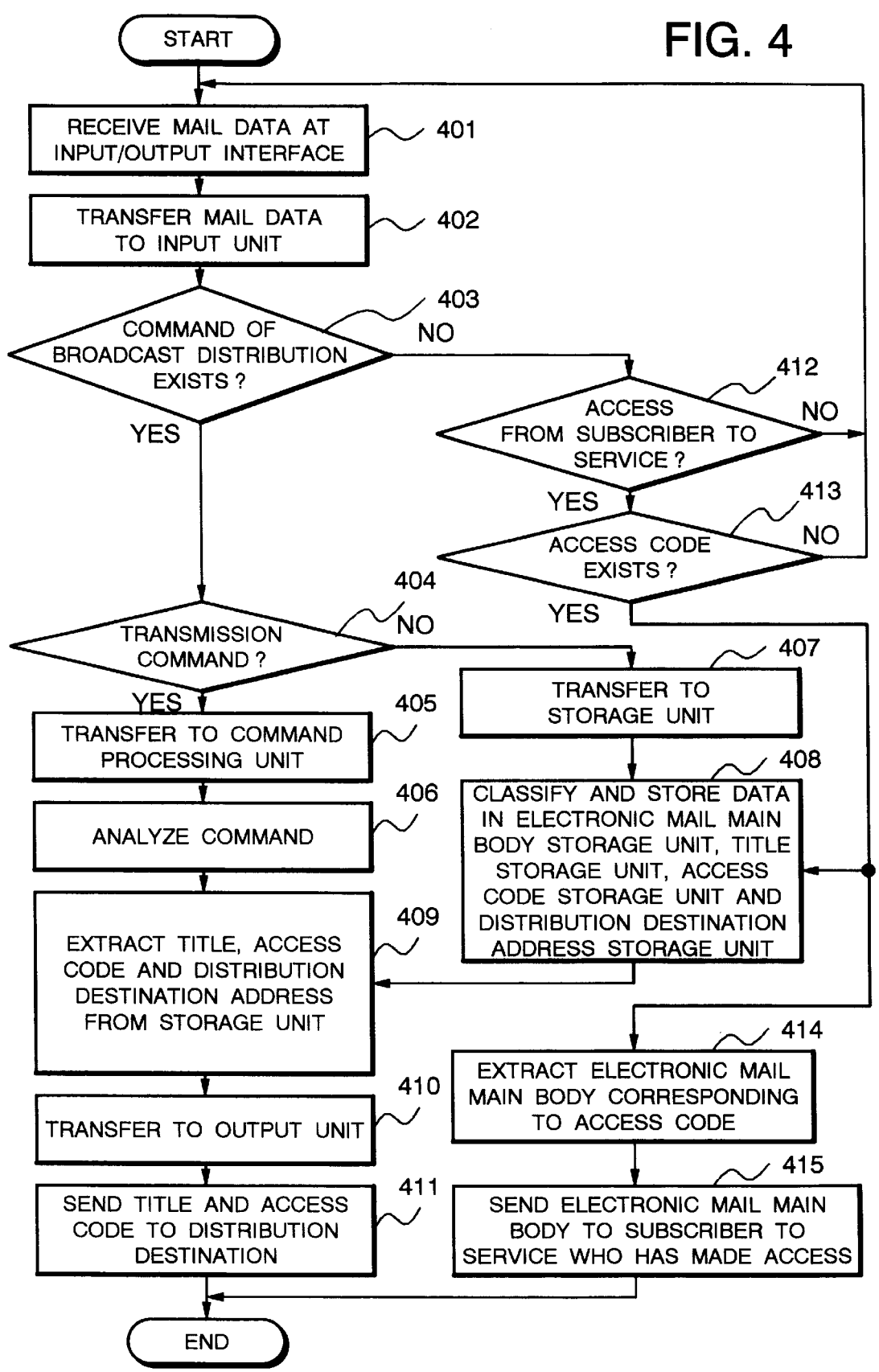
FIG. 4 is a flow chart showing operation of the mail server in the present embodiment.
Figure 5:
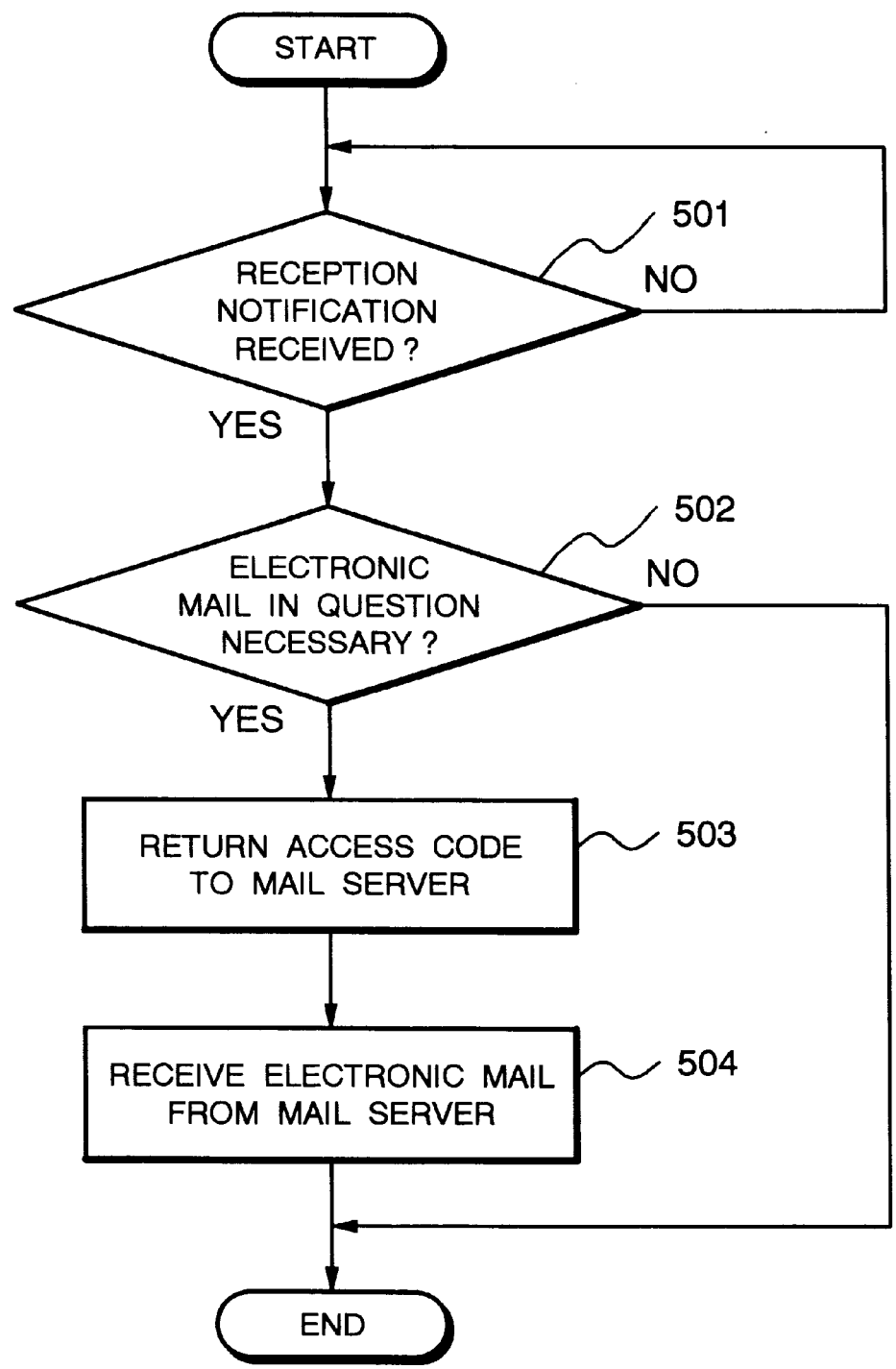
FIG. 5 is a flow chart showing operation of an accepting station in the present embodiment.
Figure 6:
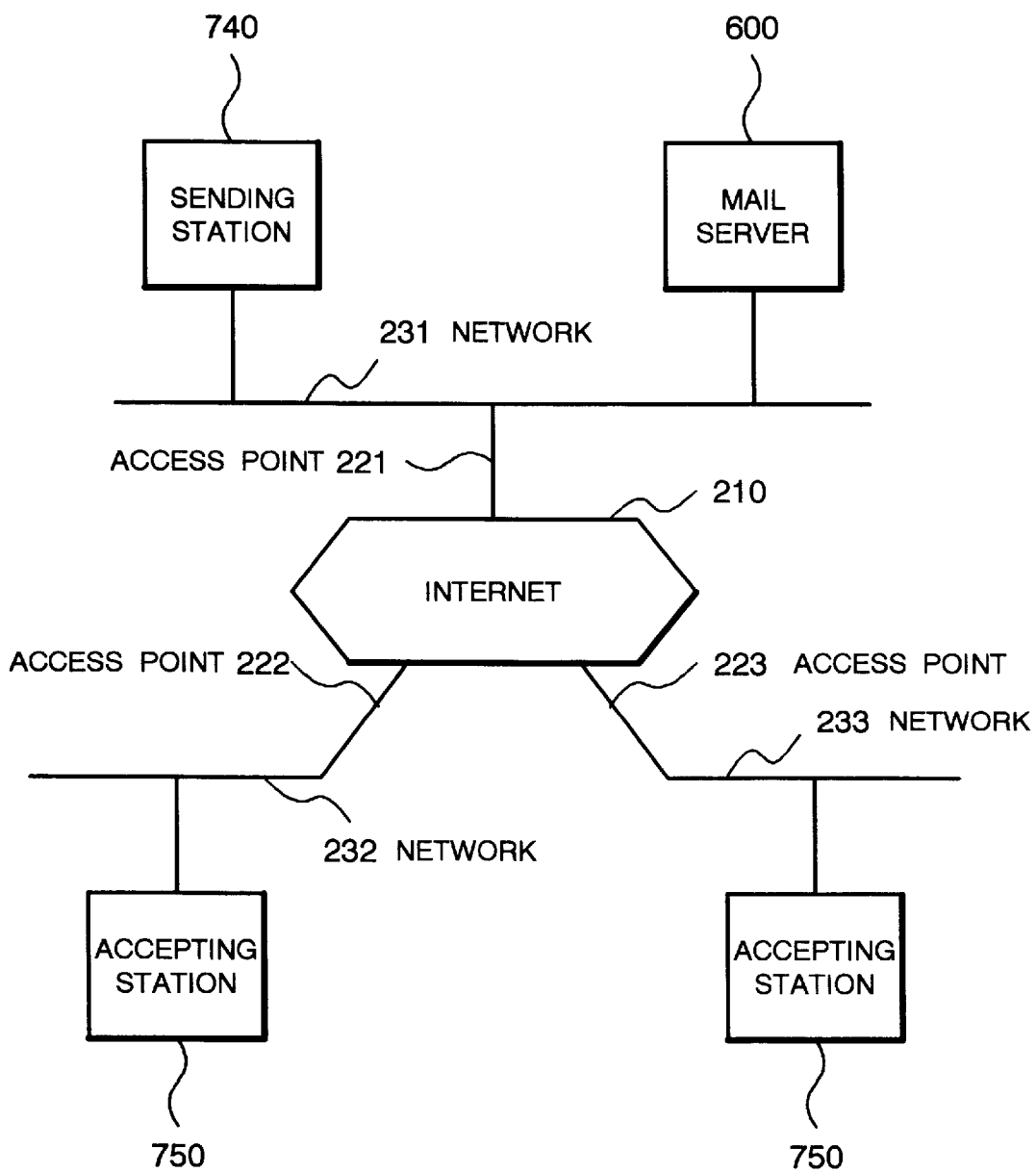
FIG. 6 is a schematic diagram showing structure of an electronic mail system.
Figure 7:
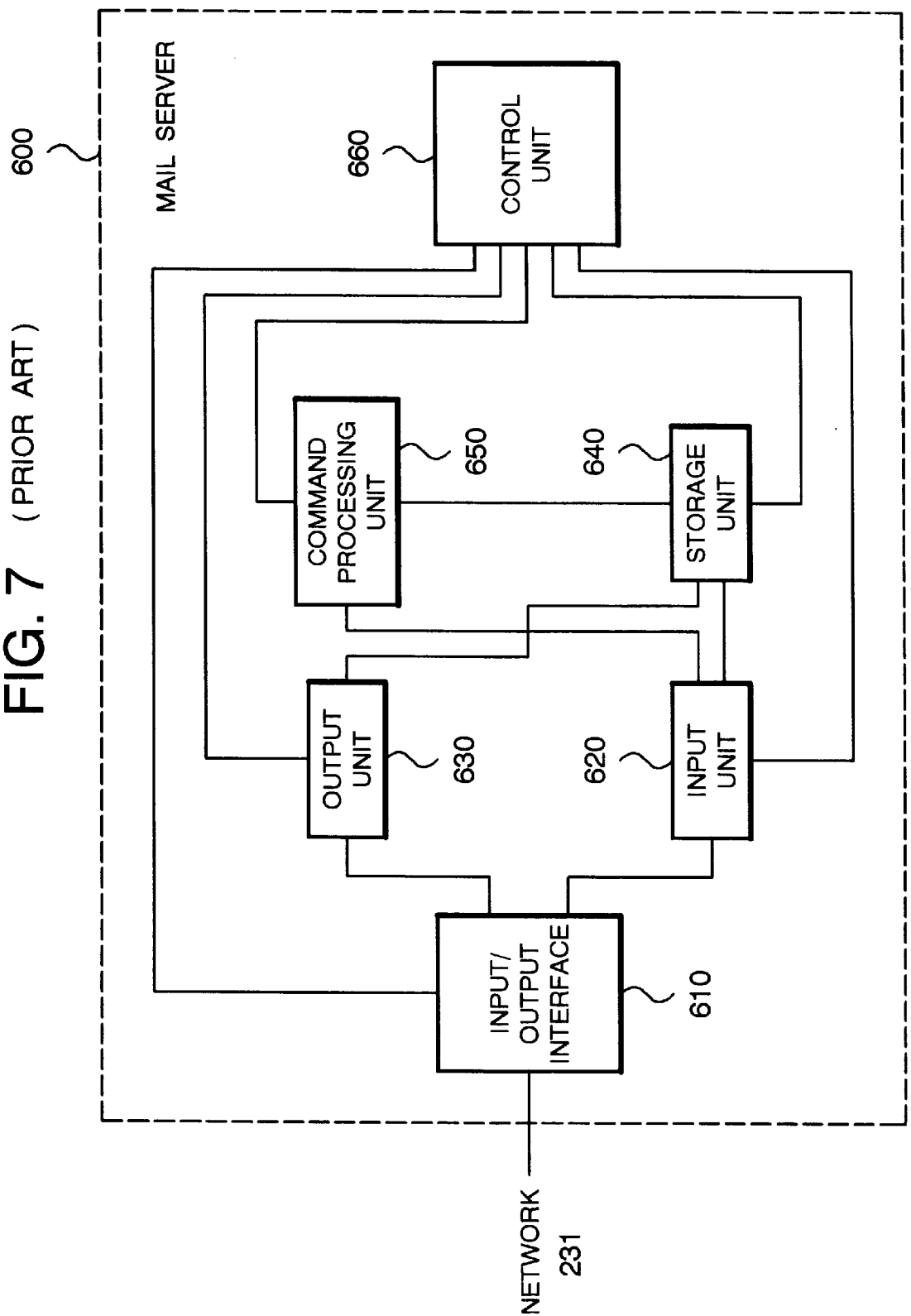
FIG. 7 is a block diagram showing structure of a mail server in a conventional electronic mail system.

Next, with reference to FIGS. 1 and 2 and flow charts of FIGS. 3 to 5, description will be made of operation of the present embodiment with respect to an example in which the sending station 240 distributes electronic mail by broadcast communication to the two accepting stations 250 shown in FIG. 1 through the mail server 100. FIG. 3 is a flow chart showing operation to be conducted when the sending station 240 broadcast-distributes electronic mail, FIG. 4 is a flow chart showing operation of the mail server 100 and FIG. 5 is a flow chart showing operation of the accepting station 250.

Operation of the sending station 240 will be described. With reference to FIG. 3, when electronic mail to be broadcast-distributed is generated at the sending station 240 (Step 301), the sending station 240 first produces an access code related to a main body of the electronic mail in question (Step 302). When a distribution destination of the electronic mail is registered at the mail server 100 in advance, the station 240 selects the registered distribution destination code as transmission destination data of the electronic mail in question (Steps 303 and 304). On the other hand, when a distribution destination of the electronic mail in question is not registered at the mail server 100, the station 240 produces a distribution destination list as transmission destination data (Steps 303 and 305). Next, the station 240 sends a set of mail data containing a main body of the electronic mail, a title of the electronic mail, an access code, transmission destination data and a transmission command to the mail server 100 (Step 306). For conducting broadcast distribution, a command indicating that the mail is to be broadcast-communicated is added to the mail data. This command may be added, for example, as a transmission command indicative of a transmission condition.

Title of electronic mail contained in mail data may include only a header of a main body of the electronic mail or also include an excerpt of the contents of the electronic mail main body. Although in the above-described operation example, a title and an access code are assumed to be produced at the sending station 240, they may be produced at the mail server 100 under control of the control unit 160.

Next, operation of the mail server 100 upon reception of electronic mail instructing on broadcast mail distribution will be described. When at the mail server 100, the input/output interface 110 receives mail data from the network 111 (Step 401), the mail data is transferred to the input unit 120 by the instruction from the control unit 160 (Step 402). The input unit 120 searches the received mail data for a command indicative of broadcast distribution (Step 403). Upon detecting a command indicative of broadcast distribution, the input unit 120 extracts a transmission command from the mail data and transfers the same to the command processing unit 150 (Steps 404 and 405). The unit 120 also transfers other data than the transmission command to the storage unit 140 (Steps 404 and 407).

The command processing unit 150 analyzes the received transmission command in question (Step 406). The storage unit 140 classifies the received data to store a main body of the electronic mail in the electronic mail main body storage unit 141, a title of the electronic mail in the title storage unit 142, an access code in the access code storage unit 143 and transmission destination data in the transmission destination address storage unit 144 (Step 408).

After analyzing the transmission command under control of the control unit 160, the command processing unit 150 reads a title, an access code and transmission destination data indicated by the analysis result from the storage unit 140 (Step 409) and transfers the same to the output unit 130 (Step 410). The output unit 130 sends a pair of received title and access code as a reception notification to the accepting station 250 of every receiver indicated by the transmission destination data (Step 411).

When at Step 403, no command indicative of broadcast distribution is detected, determination is made whether it is access from a subscriber to the service or not (Step 412) and when it is the access from a subscriber to the service, check is made whether an access code is contained in the mail data in question or not (Step 413). When it is not access from a subscriber to the service, or when no access code is contained in the mail data, appropriate error processing such as return of an error message is conducted to finish the routine.

When an access code is contained in the mail data, an electronic mail main body corresponding to the access code is read from the electronic mail main body storage unit 141 at the storage unit 140 and transferred to the output unit 130 under control of the control unit 160 (Step 414). The output unit 130 sends the received main body of the electronic mail to the accepting station 250 of the subscriber to the service who has made access (Step 415).

Depending on the contents of a transmission command or a control program of the control unit 160, it is possible to hold a title and an access code of electronic mail in pairs in a mail box of each subscriber to the service provided at the storage unit 140 to distribute a reception notification containing the tile and the access code in response to access by electronic mail from a subscriber to the service.

Description will be next made of operation of the accepting station which has received a set of a title and an access code. Upon receiving a reception notification containing a title and an access code of electronic mail (Step 501), the accepting station 250 outputs and displays the contents of the reception notification to wait for determination to be made by a subscriber to the service as a user. The subscriber to the service in question refers to the title of the electronic mail displayed on the accepting station 250 to determine whether to receive the electronic mail in question or not (Step 502). For receiving the electronic mail in question, the station 250 sends back electronic mail for request of the electronic mail main body containing the access code contained in the reception notification to the mail server 100 (Step 503). The mail server 100 having received the return mail sends the main body of the electronic mail to the accepting station 250 following the procedure shown at Steps 412 to 415 of FIG. 4. Then, the accepting station 250 receives the main body of the electronic mail in question to complete the processing (Step 504).

When the subscriber to the service determines at Step 502 that the electronic mail in question is unnecessary, the accepting station finishes the processing without returning mail to the mail server 100.

As described in the foregoing, by first sending only a title and an access code of electronic mail, the broadcast communication system of the present embodiment and the electronic mail distribution method thereof achieve more drastic reduction in the amount of data transmitted than that achieved by a conventional distribution method in which a main body of electronic mail is sent to all terminal units. This prevents enormous traffic from concentrating on a part of a network at the time of data transmission.

In addition, sending a main body of electronic mail only to a subscriber to service who wants to receive the electronic mail enables more efficient use of a network line than that by a conventional distribution method in which a main body of electronic mail is sent to all terminal units irrespective of intention of subscribers to the service.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A broadcast communication system for distributing electronic mail to a plurality of subscribers to service at a time by means of an electronic mail system, comprising:
    a mail server and a first and second terminal units connected with each other over a network, wherein
        said first terminal unit for sending electronic mail,
            sends electronic mail containing at least body of electronic mail, transmission destination data indicative of a transmission destination of the electronic mail, a first command indicative of a transmission condition of the electronic mail and a second command indicating that the electronic mail is to be broadcast-distributed, said mail server;
        upon reception of said electronic mail containing said second command, transmits a title of the body of said electronic mail and an access code for accessing the body of said electronic mail to all of said second terminal units as transmission destinations indicated by said transmission destination data contained in said electronic mail, said title of said electronic mail including an excerpt of the body of said electronic mail, said title and said body of said electronic mail being stored separately; and
        upon reception of request for the body of said electronic mail, transmits the body of said electronic mail corresponding to the access code back to said second terminal unit which has transmitted the request for the body of said electronic mail, and said
    second terminal unit for receiving said electronic mail,
        upon reception of said title and said access code from said mail server, for receiving distribution of the body of said electronic mail corresponding to the title and the access code, transmits electronic mail containing the access code to said mail server.

2. The broadcast communication system as set forth in claim 1, wherein
    said second terminal unit transmits electronic mail containing not said second command but said access code to said mail server as said request for the body of said electronic mail.

3. The broadcast communication system as set forth in claim 1, wherein
    said first terminal unit produces said title of the body of said electronic mail body to be transmitted and said access code, adds said title and said access code to corresponding said electronic mail and transmits said electronic mail.

4. The broadcast communication system as set forth in claim 1, wherein said mail server, upon reception of said electronic mail containing said second command, produces, based on the body of said electronic mail, said title of the body of said electronic mail and said access code and adds said title and said access code to said electronic mail.

5. The broadcast communication system as set forth in claim 1, wherein
    said second command is included in said first command.

6. An electronic mail distribution method of conducting broadcast communication for distributing electronic mail to a plurality of subscribers to service at a time by means of an electronic mail system including a mail server and a first and second terminal units connected with each other over a network, comprising the steps of:
    in said first terminal unit for sending electronic mail,
        producing electronic mail containing body of electronic mail, a title of the body of said electronic mail, transmission destination data indicative of a transmission destination of the electronic mail, a first command indicative of a transmission condition of the mail, a second command indicating that the mail is to be broadcast-distributed and an access code for accessing the body of the electronic mail, said title and said body of said electronic mail being stored separately; and
        transmitting said electronic mail produced to said mail server,
    in said mail server,
        checking whether received electronic mail contains said second command,
        upon detection of said second command, transmitting said title of the body of said electronic mail and said access code contained in said electronic mail, said title including an excerpt of the body of said electronic mail to all of said second terminal units of transmission destinations indicated by said transmission destination data contained in said electronic mail,
        upon detection of none of said second command, checking whether said access code is contained in said electronic mail, and
        upon detection of said access code, transmitting the body of said electronic mail corresponding to said access code detected to said terminal unit which has sent said electronic mail,
    in said second terminal unit for receiving said electronic mail
        upon reception of said title and said access code from said mail server, transmitting electronic mail containing said access code to said mail server according to indication of receiving distribution of the body of said electronic mail from a user.

7. The electronic mail distribution method as set forth in claim 6 wherein
    in said second terminal unit, further including a step of urging a user to determine whether to receive distribution of the body of said electronic mail corresponding to said title and access code received, upon reception of said title and said access code from said mail server.

8. The electronic mail distribution method according to claim 6 wherein
in said first terminal unit, said electronic mail data producing step comprising:
at the production of said transmission destination data, checking whether a transmission destination of said electronic mail is registered at said mail server,
when said transmission destination is registered at said mail server, selecting the registered code, as said transmission destination data, and
when said transmission destination is not registered at said mail server, producing a list of transmission destinations as said transmission destination data.

9. A computer readable memory storing a computer program for conducting broadcast communication for distributing electronic mail to a plurality of subscribers to service at a time by means of an electronic mail system including a mail server and a first and second terminal units connected with each other over a network, said computer program comprising the steps of:
in said first terminal unit for sending electronic mail,
producing electronic mail containing body of electronic mail, a title of the body of said electronic mail, transmission destination data indicative of a transmission destination of the electronic mail, a first command indicative of a transmission condition of the mail, a second command indicating that the mail is to be broadcast-distributed and an access code for accessing the body of the electronic mail, said title and said body of said electronic mail being stored separately; and
transmitting said electronic mail produced to said mail server,
in said mail server,
checking whether received electronic mail contains said second command,
upon detection of said second command, transmitting said title of the body of said electronic mail and said access code contained in said electronic mail, said title including an excerpt of the body of said electronic mail, to all of said second terminal units of transmission destinations indicated by said transmission destination data contained in said electronic mail,
upon detection of none of said second command, checking whether said access code is contained in said electronic mail, and
upon detection of said access code, transmitting the body of said electronic mail corresponding to said access code detected to said terminal unit which has sent said electronic mail,
in said second terminal unit for receiving said electronic mail,
upon reception of said title and said access code from said mail server, transmitting electronic mail containing said access code to said mail server according to indication of receiving distribution of the boy of said electronic mail from a user.

10. The computer readable memory as set forth in claim 9 wherein
in said second terminal unit, further including a step of urging a user to determine whether to receive distribution of the body of said electronic mail corresponding to said title and access code received, upon reception of said title and said access code from said mail server.

11. The computer readable memory as set forth in claim 9 wherein
in said first terminal unit,
said electronic mail data producing step comprising
at the production of said transmission destination data, checking whether a transmission destination of said electronic mail is registered at said mail server,
when said transmission destination is registered at said mail server, selecting the registered code as said transmission destination data, and
when said transmission destination is not registered at said mail server, producing a list of transmission destinations as said transmission destination data.

12. A method of distributing electronic mail to a plurality of subscribers which permits recipients to prohibit the transmission of unwanted messages, comprising the steps of:
receiving in a mail server an electronic message from a sender addressed to a recipient;
separating an excerpt of said electronic message from a main body of said electronic message;
storing said main body of said electronic message in a memory of said mail server separate from said excerpt of said electronic message;
transmitting to said recipient said excerpt of said electronic message and an access code for retrieving said main body of said electronic message from said memory;
receiving said excerpt of said electronic message by said recipient and determining if said main body of said electronic message is desired; and
using said access code to cause said mail server to transmit said main body of said electronic message to said recipient only if said main body is desired by said recipient.

* * * * *